Nov. 6, 1962   H. E. SKETT ETAL   3,062,224
APPARATUS FOR CLEANING A VACUUM MILKING PLANT
Filed Feb. 24, 1961   5 Sheets-Sheet 1

INVENTORS
H. E. Skett -
S. J. D. Randall - C. R. Jordan
BY
ATTORNEYS

INVENTORS
H. E. Skett -
S. J. D. Randall - C. R. Jordan
BY

ATTORNEYS

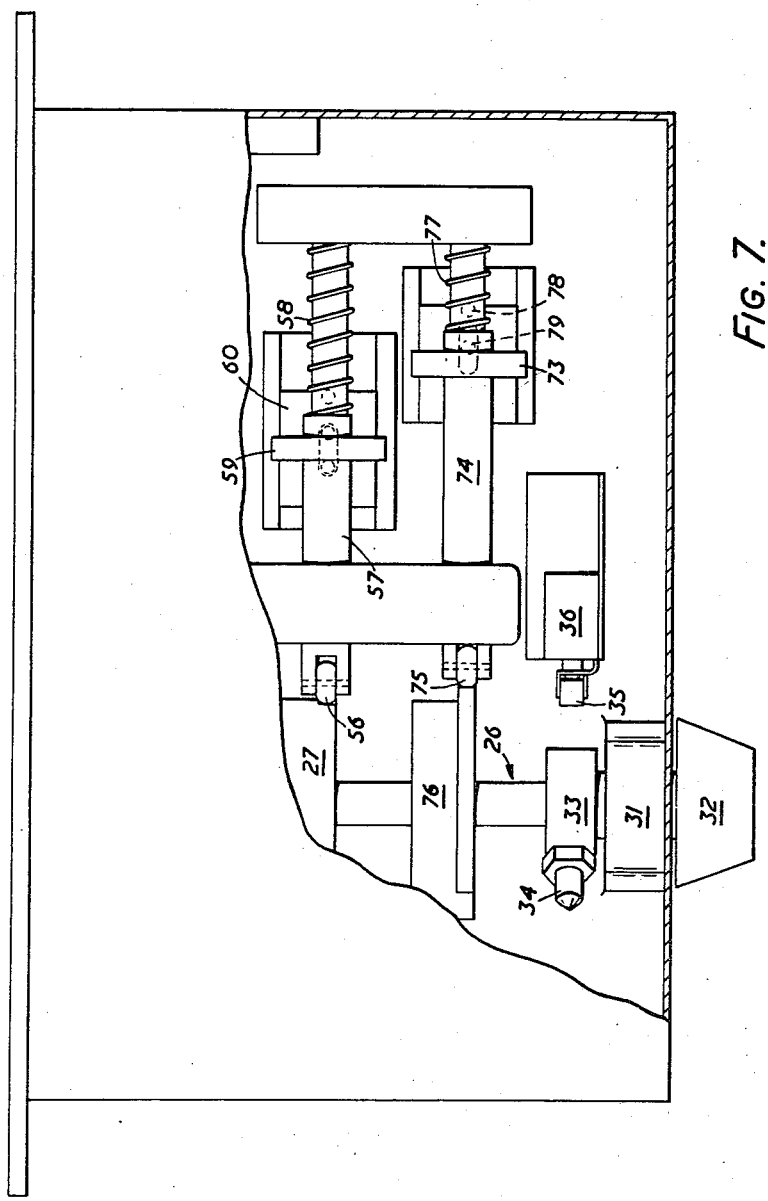

United States Patent Office 3,062,224
Patented Nov. 6, 1962

3,062,224
APPARATUS FOR CLEANING A VACUUM MILKING PLANT
Herbert Edward Skett, Ellesmere, Stirling James Donald Randall, Pulborough, and Cecil Robert Jordan, Thorpe Bay, England, assignors to R. J. Fullwood & Bland Limited, London, England
Filed Feb. 24, 1961, Ser. No. 91,384
Claims priority, application Great Britain June 27, 1960
11 Claims. (Cl. 134—58)

This invention relates to apparatus for cleaning a vacuum milking plant.

It is necessary to clean a vacuum milking plant after it has been used and, in the case of a plant of the pipeline type in which milk is conveyed from the animal or animals being milked through a pipeline into the dairy or other milk-receiving room, it is common practice to do this by drawing a detergent solution through the system for a given time, generally from 5 to 20 minutes, and then drawing a rinsing liquid through the system for about 5 minutes. It is convenient to use the vacuum pump of the milking plant to draw the washing and rinsing liquids through the system and, when the cleaning operation has been completed, it is necessary to switch off the milking plant, that is to say, to switch off the electric motor that drives the vacuum pump, and if the plant includes an electromagnetically operated pulsator that has been in operation during the cleaning operation, to switch that off also. It is an object of this invention to provide apparatus that will provide the required sequence of operations automatically.

The invention provides apparatus for cleaning a vacuum milking plant, which apparatus comprises a wash tank, means for supplying a rinsing liquid to the wash tank, outlet means for emptying the wash tank, means for controlling the supply means and outlet means, switch means for arresting the operation of the milking plant, cam means for operating the control means and the switch means, and means for driving the cam means, the driving means being operable by a pulsating vacuum and arranged to advance the cam means through a given distance at each pulsation, and the cam means being arranged so to operate the control means and the switch means as to cause the outlet means to open to empty the wash tank after the elapse of a predetermined washing period, then to cause the outlet means to close, thereafter to cause the supply means to supply rinsing liquid to the wash tank and, after the elapse of a predetermined rinsing period, to switch off the milking plant.

In operation, the wash tank is filled initially with a washing liquid and the teat cups of the milking plant are placed in the wash tank and connected to the reduced pressure pipeline and thence to the main milk pipeline of the plant, which is placed in communication with the tank. The supply means is charged with a rinsing liquid and the driving means is connected to a pulsator of the milking plant. The milking plant is then switched on and thereafter the required sequence of cleaning operations occurs automatically. The reduced pressure that prevails within the liners of the teat cups causes the liquid in the wash tank to be sucked up through the liners and the milk tubes and through the reduced pressure line and milk recording jars (if they are used) into the main milk pipeline from whence it is returned to the wash tank through the releaser or milk pump, which is normally used on a milking plant of the pipeline type. At the same time, the operation of the pulsator causes the driving means to advance the cam means progressively. When the level of the liquid in the wash tank falls below the teat cups, air is admitted into the system and in some milking plants, especially large ones, this can cause the degree of vacuum in the pipeline to fall to a point at which the driving means ceases to operate. Also, in order to shorten the period required for emptying the wash tank, it is desirable to stop the circulation of liquid through the plant as soon as the outlet means opens. Advantageously, therefore, there is provided cut-off means for interrupting communication between the interiors of the liners of the teat cups and the supply of reduced pressure, and the control means is arranged to operate the cut-off means to interrupt communication between the interiors of the liners of the teat cups and the supply of reduced pressure whenever, and only while, the outlet means is open, and the cam means is arranged to cause the supply means to supply liquid to the wash tank immediately after the cam means causes the outlet means to close after drainage of the washing liquid.

Advantageously, the cam means is arranged so to operate the control means as to cause the outlet means to open to empty the wash tank after the rinsing period and before switching off the milking plant.

There may be provided additional supply means and the cam means may be arranged so to operate the control means as first to cause the outlet means to open to empty the wash tank after the elapse of a predetermined pre-rinsing period, then to cause the additional supply means to supply washing liquid to the wash tank immediately after the cam means causes the outlet means to close after drainage of the pre-rinsing liquid. In operation, the wash tank of this form of apparatus is filled initially with a pre-rinsing liquid and the additional supply means is charged with the washing liquid.

The or each supply means advantageously comprises a vessel for containing a rinsing liquid, conduit means through which the liquid can flow under gravity from the vessel to the wash tank, and valve means for closing the conduit means. The outlet means advantageously comprises an outlet for draining the wash tank and valve means for closing the outlet. Preferably, the or each supply valve means and the outlet valve means each comprise a valve and pressure-responsive means for actuating the valve. The control means then advantageously comprises control valve means for controlling the application of a reduced pressure from the vacuum milking plant to the pressure-responsive means for actuating the supply and outlet valves, and follower means engaging the cam means and arranged to actuate the control valve means.

The cut-off means advantageously comprises a cut-off valve and pressure-responsive means for actuating the cut-off valve, the pressure-responsive means of the cut-off means being connected in parallel with the pressure-responsive means of the outlet means.

Advantageously the driving means comprises a ratchet wheel, and a pawl engaging the ratchet wheel, and the arrangement is such that the pawl is caused to reciprocate in response to the pulsating vacuum, thereby causing the ratchet wheel to rotate.

Advantageously, the cam means comprises a rotary cam coupled to the ratchet wheel by reduction gearing, the arrangement being such that the cam performs substantially one revolution during a complete cleaning operation. Preferably, the drive from the ratchet wheel to the rotary cam includes a friction drive and there is provided means for rotating the cam manually to override the friction drive for adjusting the starting position of the cam. This enables the duration of the washing period to be varied. Means may be provided for indicating visually the position of the cam. Thus there may be provided a pointer coupled to the cam and arranged to move over a scale calibrated approximately in minutes and showing the stage reached in the sequence of operations.

Two forms of apparatus for cleaning vacuum milking plants and constructed in accordance with the invention will now be described in greater detail by way of example with reference to the accompanying drawings in which:

FIG. 7 is a plan view on a larger scale of the timing device of the apparatus shown in FIG. 6 with the cover partially cut away.

Figure 1:
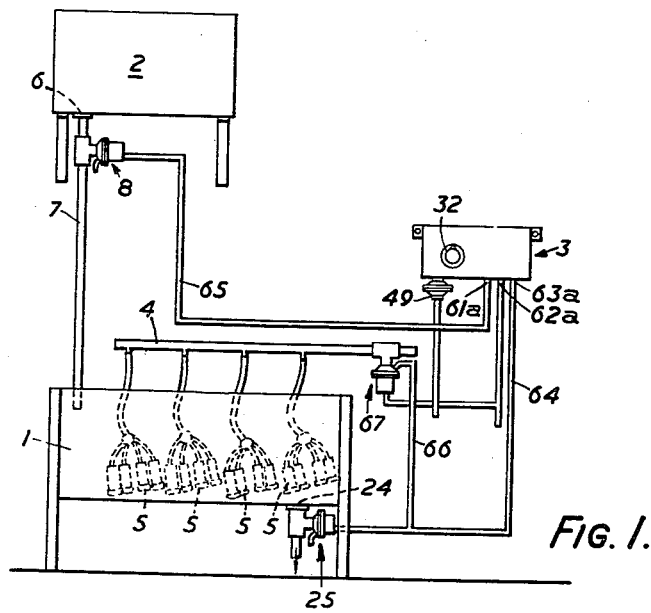
FIG. 1 is a diagrammatic side elevation of one form of apparatus.

Referring to FIG. 1 of the drawings, the first form of apparatus comprises a wash tank 1, a supply vessel 2, and a timing device which is indicated generally by the reference numeral 3. The wash tank 1 is open at the top and is mounted beneath a manifold 4, which is connected to the main vacuum line (not shown) of a vacuum milking plant and to which can be connected one or more teat-cup clusters 5 of the milking plant. The vessel 2, which is mounted vertically above the wash tank 1, also has the form of a tank for containing a rinsing liquid. The vessel 2 has an outlet 6 formed in its base from which a pipe 7 leads vertically downwards and terminates with its open end just within and close to one end corner of the wash tank 1. The outlet 6 is closable by a valve which is indicated generally by the reference numeral 8 and is situated close to the outlet 6.

Figure 5:
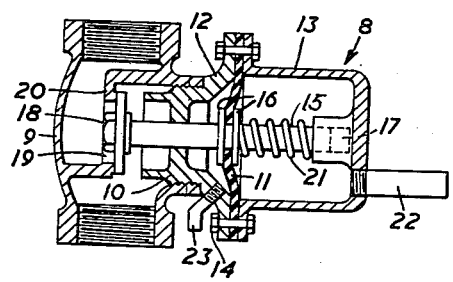
FIG. 5 is an axial section on a larger scale of one of the valves of the apparatus shown in FIG. 1.

Referring to FIG. 5 of the drawings, the valve 8 comprises a generally cylindrical member 9 being internally screw-threaded at its ends to receive externally screw-threaded end portions of the pipe 7. The cylindrical member 9 has a circular aperture in its side into which screws one end portion 10 of a substantially cylindrical casing, which houses a circular flexible rubber diaphragm 11 and is formed from two caps 12 and 13. The diaphragm 11 is clamped at its periphery between annular flanges that are formed at the bases of the caps 12 and 13 and are secured together by bolts 14. Extending axially along the cylindrical casing is a spindle 15 that passes through the centre of the diaphragm 11 and is fixed thereto by discs 16. One end of the spindle 15 is received by a recess 17 in the end part of the cap 13 and is free to slide therein axially with respect to the cylindrical casing. Towards its other end, the spindle 15 passes centrally through an aperture in the end portion 10 of the cap 12 and forms a liquid-tight seal. At that end, the spindle 15 is attached to a valve member 18 that seals, when in the closed position, an aperture 19 in the middle part of a Z-shaped flange 20 which extends across the cylindrical member 9.

Surrounding the spindle 15 is a helical spring 21 which acts in compression between one of the discs 16 and the inner end face of the cap 13 and adjacent to the recess 17. A nipple 22 screwed into an aperture in the end portion of the cap 13 enables a reduced pressure to be applied to the chamber bounded by the cap 13 and the diaphragm 11, and a nipple 23 screwed into an aperture in the side portion of the cap 12 provides communication between the other side of the diaphragm 11 and the atmosphere. When atmospheric pressure is applied to the nipple 22, the valve 8 remains closed under the action of the spring 21, but, when a reduced pressure is applied to the nipple 22 the valve 8 opens as the diaphragm 11 responds to the pressure difference across it and overcomes the action of the spring 21.

The wash tank 1 also has an outlet 24 which is formed in the base of the tank 1, and is closable by a valve 25. The valve 25 is exactly similar to the valve 8 already described with reference to FIG. 5 of the accompanying drawings. Thus the valve 25 is also maintained in a closed position unless a reduced pressure is applied to the associated nipple 22.

Figure 2:
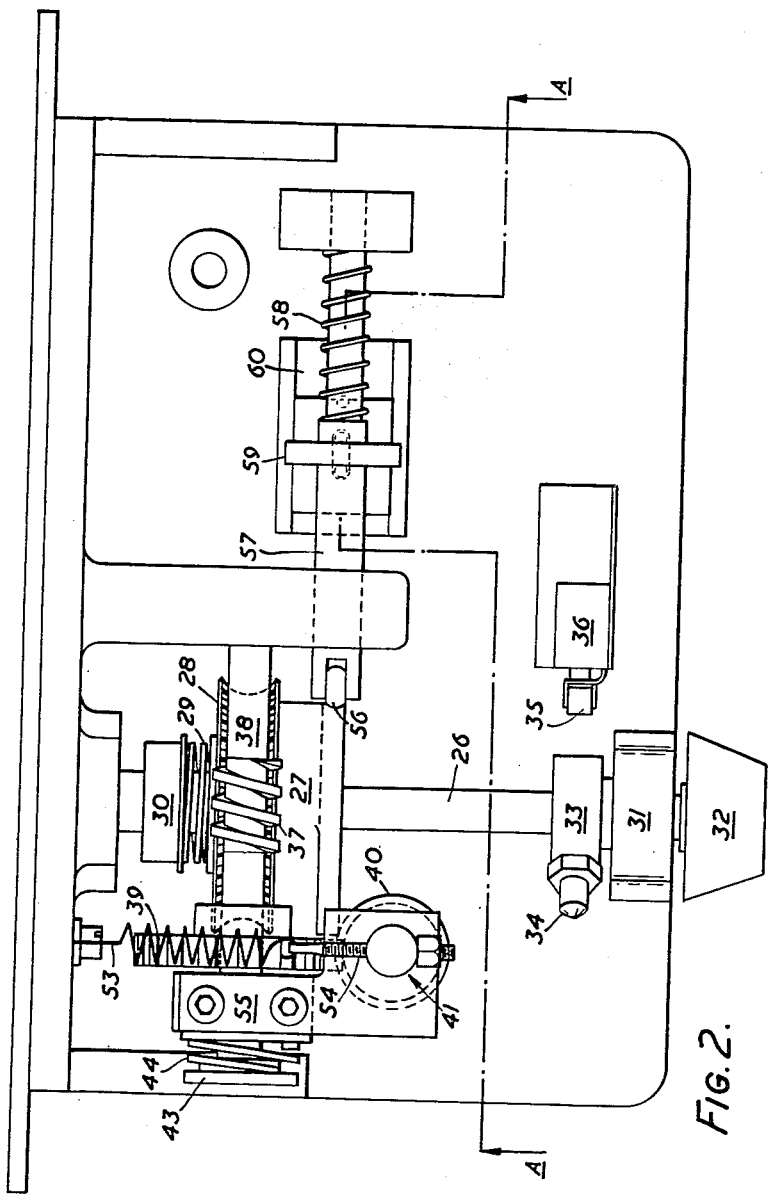
FIG. 2 is a plan view on a larger scale of the timing device of the apparatus shown in FIG. 1 with the cover removed.
Figure 3:
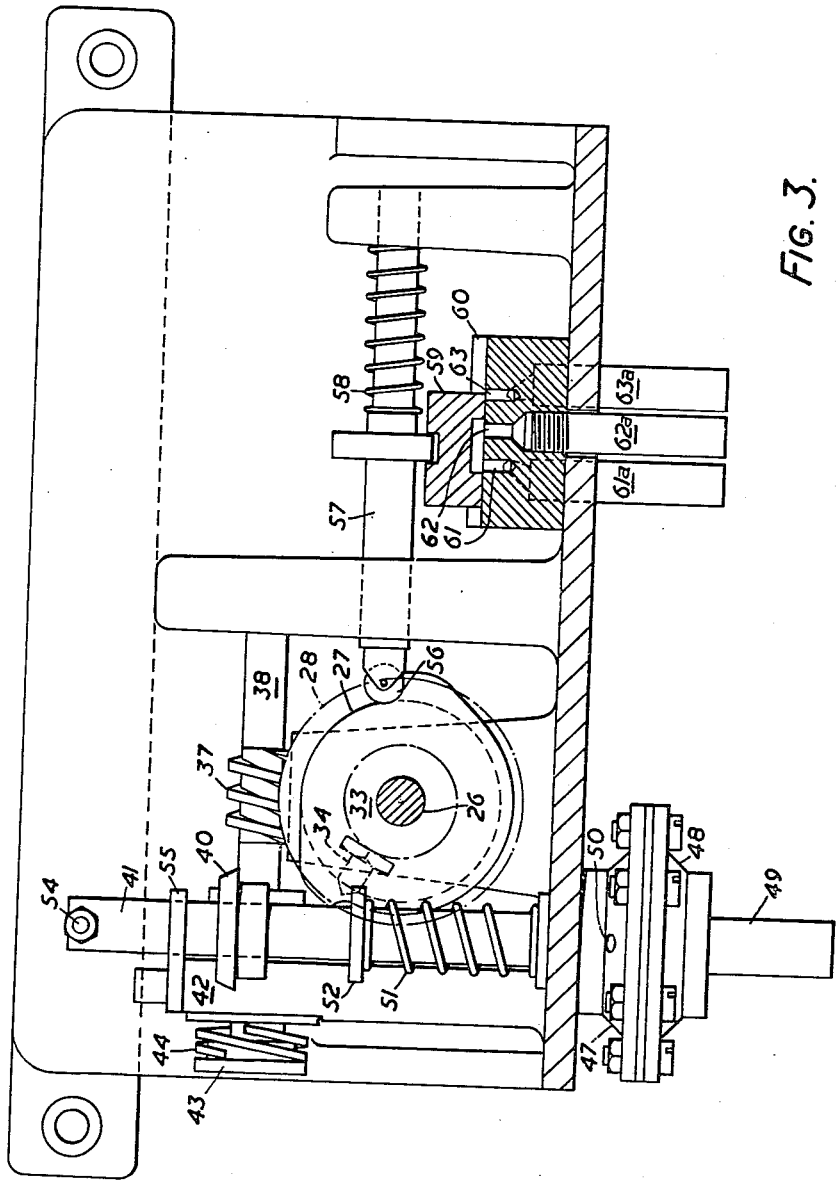
FIG. 3 is a section taken on the line A—A of FIG. 2.
Figure 4:
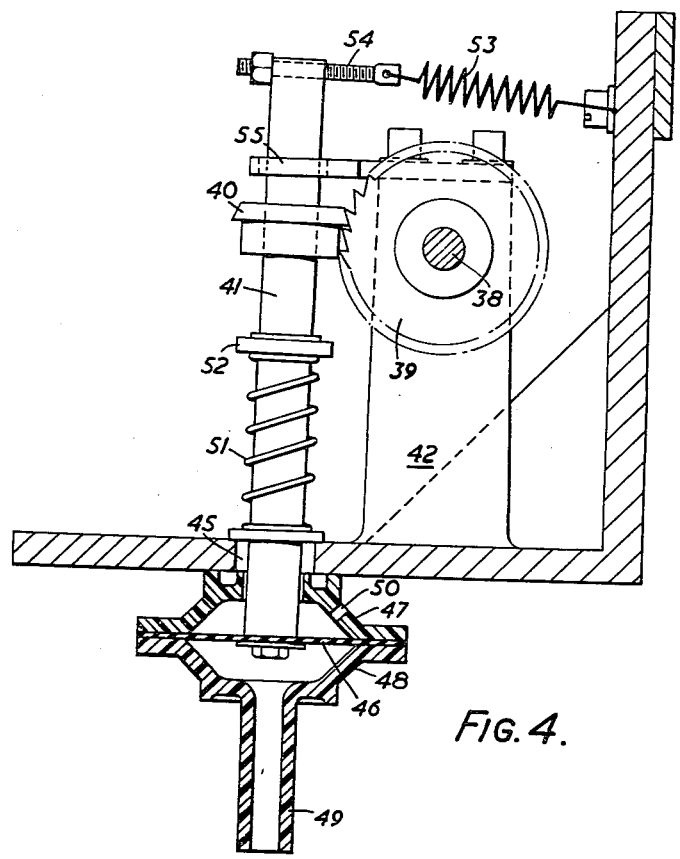
FIG. 4 is a vertical section on a still larger scale of a part of the timing device shown in FIGS. 2 and 3.

Referring to FIGS. 2, 3, 4 of the accompanying drawings, the timing device 3 is enclosed in a box and comprises a rotatably journalled horizontal cam shaft 26 on which a cam 27 is fixed. A pinion 28 is freely rotatably mounted on the cam shaft 26 next to the cam 27. A spring 29 surrounds the cam shaft 26 on the side of the pinion 28 remote from the cam 27 and acts in compression between the pinion 28 and a collar 30 fixed to the camshaft close to one end thereof. Thus, the pinion 28 is resiliently urged against the cam 27 and the adjacent faces of the cam 27 and the pinion 28 are covered with a suitable material for providing a friction drive from the pinion 28 to the cam 27. The cam shaft 26 extends on the side of the cam 27 remote from the pinion 28 through the wall of the box and adjacent the wall of the box the shaft 26 is journalled in a fixed member 31. Fixed to that end of the cam shaft 26 outside the wall of the box is a knurled knob 32. Manual rotation of the knurled knob 32 can override the friction drive between the pinion 28 and the cam 27. Near the bearing 31 and between the bearing 31 and the cam 27 there is fixed a collar 33 carrying a pin 34 which extends at right angles to the shaft 26, and engages an operating button 35 of a micro-switch 36 when the cam shaft 26 is in one position. The switch 36 remains open except when the operating button 35 is engaged by the pin 34.

The pinion 28 is driven by a worm 37 which is fixed on a rotatably journalled horizontal driving shaft 38 that is mounted directly above the pinion 28 and extends at right angles to the cam shaft 26. Also fixed to the driving shaft 38 is a ratchet wheel 39 which is engaged by a pawl 40 (see FIG. 4) that is in the form of a collar secured on a vertical spindle indicated generally by the reference numeral 41 towards the upper end thereof. On the side of the rotatable wheel 39 remote from the worm 37, the driving shaft 38 is journalled in a supporting member 42. The end of the driving shaft 38 beyond the supporting member 42 is screw-threaded and, screwed into that end, is a knurled adjustable nut 43 having a locking screw (not shown). Acting in compression between the inner face of the nut 43 and the outer face of the supporting member 42 is a spring 44. The spring urges the outer face of the ratchet wheel 39 against the inner face of the support member 42 maintaining thereby sufficient frictional contact between them to prevent rotation of the ratchet wheel 39 unless under action of the pawl 40.

Referring to FIG. 4 of the drawings, the spindle 41 carrying the pawl 40 passes through a hole 45 in the base of the box housing the timing device 3 and is secured close to its lower end below the base of the box to a horizontal circular diaphragm 46 which is made of rubber or other suitable flexible material and which is clamped between the peripheral portions of upper and lower dome-shaped members 47 and 48 respectively which are secured to the floor of the box. The lower member 48 is formed with a cylindrical extension which leads to a nipple 49. The upper dome-shaped member 47 has an aperture 50 formed in it so that the upper face of the diaphragm 46 is subjected to atmospheric pressure. When a reduced pressure is applied to the nipple 49, the diaphragm 46 flexes downwardly against the action of a compression spring 51, surrounding the spindle 41 and acting between a stop 52 situated on the spindle 41 beneath the pawl 40, and the base of the box housing the timing device 3, thus moving the spindle 41 downwardly and causing the ratchet wheel 39 to advance. When atmospheric pressure is again applied to the nipple 49, the spring 51 moves the diaphragm 46 upwardly so that the spindle 41 returns to its normal position as shown in FIG. 4.

Because the pawl 40 is fixed on the spindle 41 the spindle 41 has to move slightly away from the ratchet wheel 39 as the pawl returns upwardly to its normal position. To accommodate this movement, the diameter of the hole 45 is sufficiently larger than the diameter of the spindle 41 to allow the spindle 41 to rotate slightly about the point of attachment of the spindle 41 to the flexible diaphragm 46. The pawl 40 is resiliently urged against the ratchet wheel 39 by a tension spring 53 that is attached to the spindle 41 by a threaded pin 54 and acts between the upper end of the spindle 41 and the side wall of the box housing the timing device 3. Towards the upper end of the spindle 41 above the pawl 40, the spindle 41 passes through an oval aperture (not shown) in an L-shaped horizontal plate 55 that is secured to the support member 42.

The cam 27 (see FIGS. 2 and 3) is engaged by a follower roller 56 that is rotatably mounted at the end of an axially movable rod 57, which extends horizontally and at right-angles to the cam-shaft 26 and which is urged towards the cam-shaft 26 by a spring 58. The rod 57 operates a slide valve 59, which is slidable within a valve chamber 60 having three ports 61, 62 and 63 (see FIG. 3). The ports 61, 62 and 63 communicate through bores with nipples 61a, 62a and 63a respectively. When the slide valve 59 is in its central position, the central port 62 is in communication with neither of the two outer ports 61 and 63, but, when the rod 57 moves away from the cam-shaft 26, it places the central port 62 in communication with the outer port 63 and, when the rod 57 moves towards the camshaft 26, it places the central port 62 in communication with the outer port 61. The outer port 63 is connected by a flexible rubber tube 64 to the nipple 22 of the outlet valve 25 for the cleaning tank 1, and the outer port 61 is connected to the nipple 22 of the outlet valve 8 for the vessel 2 by means of a copper tube 65 fitted with short rubber connectors at each end.

Leading off from the tube 64 is a branch tube 66 of which the end remote from the tube 64 is connected to a nipple 23 on a cut-off valve 67, which is exactly similar in construction to the valve 8 (see FIG. 5). The nipple 22 of the valve 67 is connected to a part of the vacuum milking plant that is at a continuously reduced pressure. Thus the valve member 18 is maintained in the open position against the action of the spring 21 except when a reduced pressure is applied to the nipple 23, when the pressure difference across the diaphragm 11 falls to zero and the spring 21 causes the valve 67 to close.

When a reduced pressure is applied to the tube 64, the valve 25 opens as hereinbefore described and, at the same time, the cut-off valve 67 closes to cut off the manifold 4 from the main vacuum line (not shown) of the vacuum milking plant.

Fixed to the knurled knob 32 on the camshaft 26 is a pointer (see FIG. 1) which, as the camshaft 26 rotates, moves over a scale on the outside of the box. The scale is calibrated approximately in minutes and also with indications of the stage of the cleaning operation, for example, washing or rinsing, that is in progress when the pointer is in any given position.

The apparatus operates in the following way. The nipple 62a of the central port 62 of the valve chamber 60 is connected to a part of the milking plant to be cleaned that is under a continuously reduced pressure and the nipple 49 associated with the diaphragm 46, is connected to the pulsator of the plant so that the nipple 49 is placed in communication alternately with the reduced pressure and the atmosphere. The micro-switch 36 is connected in series with a relay that breaks the supply circuit to the milking plant when the relay is energised.

The cleaning tank 1 is filled with a detergent solution and the vessel 2 is filled with a rinsing liquid. The teat cups 5 of the milking plant are placed in the cleaning tank 1 and the main milk pipeline (not shown) of the plant is arranged to discharge into the cleaning tank 1 through a releaser or milk pump (not shown). The cam shaft 26 is rotated by the knurled knob 32 to its starting position, which is indicated on the scale and which is just past the position in which the pin 34 engages the operating button 35 of the micro-switch 36. The slide valve 59 is then in its central position.

When the milking plant is switched on, the action of the pulsator causes the diaphragm 46 to move up and down and so causes the camshaft 26 to rotate very slowly. At the same time, the washing liquid is sucked up through the teat cups 5 and returned to the wash tank 1 through the main milk pipeline (not shown). This continues until, at the expiration of the washing period (which is determined by the profile and setting of the cam 27), the cam 27 moves the slide valve 59 away from the cam shaft 26 so that the central port 62 is placed in communication with the port 63, which causes the valve 25 in the wash tank 1 to open and the cut-off valve 67 to close. After a relatively short draining period, during which all the washing liquid in the wash tank 1 and the liquid returning from the milking plant through the main milk pipeline is discharged, the cam 27 allows the slide valve 59 to move as rapidly as possible towards the cam shaft 26 under the action of the associated spring 58, which first interrupts the communication between the central port 62 and the port 63 and then places the central port 62 in communication with the port 61. This causes the outlet valve 25 to close and the cut-off valve 67 to open and substantially immediately thereafter causes the valve 8 in the vessel 2 to open so that the rinsing liquid runs into the wash tank 1 from where it is circulated through the milking plant. The slide valve 59 then returns to its central position.

At the expiration of the rinsing period, the slide valve 59 again moves to cause the valve 25 in the wash tank 1 to open and the cut-off valve 67 to close to allow the rinsing liquid to be discharged. The slide valve 59 then returns to its central position and, shortly afterwards, the pin 34 on the cam shaft engages the operating button 35 of the micro-switch 36, which causes the milking plant to be switched off.

When it is desired to use the milking plant again, the knurled knob 32 has first to be turned through a few degrees to its starting position so that the pin 34 disengages the operating button 35 of the micro-switch 36.

If desired, the washing period can be shortened by advancing the cam shaft 26 beyond the normal starting position by means of the knurled knob 32 before the cleaning operation begins.

Figure 6:
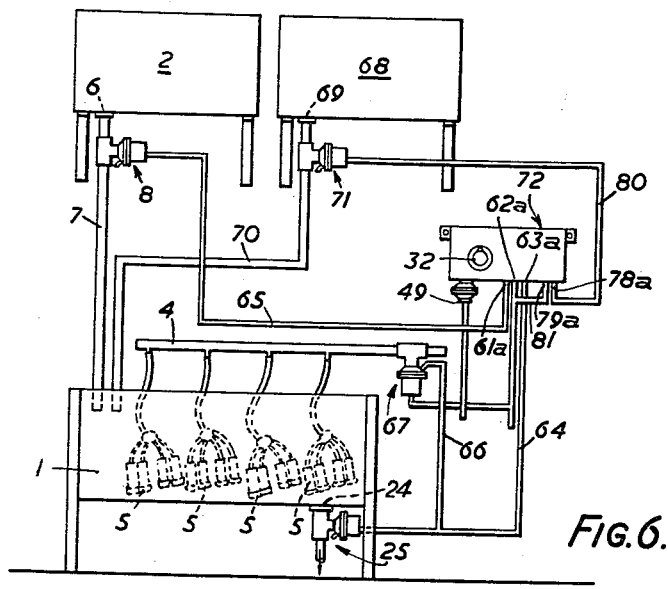
FIG. 6 is a diagrammatic side elevation of second form of the apparatus.

Referring to FIG. 6, the second form of apparatus is generally similar to the first form, but differs therefrom in that there is provided an additional supply vessel 68 which enables the milking plant to be pre-rinsed before it is washed and rinsed.

The additional supply vessel 68 has an outlet 69 in its base and an outlet pipe 70 leads downwardly from the outlet 69 to a point just within and close to one corner of the wash tank 1, where the outlet pipe 70 terminates with an open end. Fitted in the outlet pipe 70 close beneath the additional supply vessel 68 is an outlet valve 71, which is exactly similar to the valve 8 (see FIG. 5).

In order to control the operation of the outlet valve 71 in addition to the outlet valves 8 and 25, the timing device 3 of the first form of apparatus is replaced by a modified timing device 72. The timing device 72 differs from the timing device 3 in that there is provided an additional slide valve 73 (see FIG. 7) mounted by the side of the slide valve 59 and operated through the agency of a rod 74 carrying a follower roller 75 that is urged against a rotary cam 76 by a compression spring 77, the cam 76 being fixed on the camshaft 26. Thus, the two cams 27 and 76 rotate together. The slide valve 73 is substantially similar to the slide valve 59 described with reference to FIG. 3 of the accompanying drawings except that it is provided with only two ports 78 and 79 communicating by outwardly extending bores with associated nipples 78a and 79a respectively. Rotation of the cam 76 causes the slide valve 73 to move between the position in which it provides communication between the port 78 and the port 79 and a position in which there is no such intercommunication but the port 78 is in communication with the atmosphere. The nipple 22 of the valve 71 is connected by a rubber tube 80 (see FIG. 7) to the nipple 78a and the nipple 79a is connected by a branch tube 81 to the lead from the nipple 62a of the valve chamber 60 to the part of the milking plant which is under continuously reduced pressure.

The second form of apparatus operates in the following manner. The wash tank 1 is filled with a pre-rinsing liquid, the vessel 2 is filled with a rinsing liquid and the additional vessel 68 is filled with a washing liquid. The teat-cup clusters 5 of the milking plant are placed in the wash tank 1 and the main milk pipeline (not shown) is arranged to discharge into the wash tank 1. The camshaft 26 is rotated by the knurled knob 32 on the timing device 73 to its starting position in which the camshaft 26 is just past the position in which the pin 34 engages the operating button 35 of the micro-switch 36.

The relative arrangement of the cams 27 and 76 and the profile of each of the cams 27 and 76 is such that, when the milking plant is switched on, the following sequence of events occurs automatically. The pre-rinsing liquid is sucked up through the teat-cup clusters 5 and after passage through the parts of the milking plant to be cleaned is returned to the wash tank 1. After a suitable pre-rinsing period, the cam 27 moves the slide valve 59 to cause the valve 25 to open and the valve 67 to close. After a short drainage period, the cam 27 moves the slide valve 59 to cause the valve 25 to close and the valve 67 to open. Substantially immediately thereafter, the cam 76 moves the slide valve 73 to cause the valve 71 to open so that the washing liquid enters the wash tank 1. After the washing liquid has passed into the wash tank 1, the cam 76 moves the slide valve 73 to cause the valve 71 to close. Thereafter, the profile of the cam 27 is such as to bring about washing and rinsing of the parts of the milking plant to be cleaned in the manner hereinbefore described in relation to the operation of the first form of apparatus.

We claim:

1. Apparatus for cleaning a vacuum milking plant, which apparatus comprises a wash tank, means for supplying a rinsing liquid to the wash tank, outlet means for emptying the wash tank, means for controlling the supply means and outlet means, switch means for arresting the operation of the milking plant, cam means for operating the control means and the switch means, and means for driving the cam means, the driving means being operable by a pulsating vacuum and arranged to advance the cam means through a given distance at each pulsation, and the cam means being arranged so to operate the control means and the switch means as to cause the outlet means to open to empty the wash tank after the elapse of a predetermined washing period, then to cause the outlet means to close, thereafter to cause the supply means to supply rinsing liquid to the wash tank and, after the elapse of a predetermined rinsing period, to switch off the milking plant.

2. Apparatus as claimed in claim 1, wherein the cam means is arranged so to operate the control means as to cause the outlet means to open to empty the wash tank after the rinsing period and before switching off the milking plant.

3. Apparatus as claimed in claim 1, wherein there is provided additional supply means and the cam means is arranged so to operate the control means as first to cause the outlet means to open to empty the wash tank after the elapse of a predetermined pre-rinsing period, then to cause the outlet means to close and the additional supply means to supply washing liquid to the wash tank before the beginning of the washing period.

4. Apparatus as claimed in claim 1, wherein the supply means comprises a vessel for containing a rinsing liquid, conduit means through which the liquid can flow under gravity from the vessel to the wash tank, and valve means for closing the conduit means.

5. Apparatus for cleaning a vacuum milking plant which apparatus comprises a wash tank having an outlet for draining the wash tank and valve means for closing the outlet, a vessel for containing a rinsing liquid, conduit means through which the rinsing liquid can be supplied under gravity from the vessel to the wash tank, valve means for closing the conduit means, control means for the outlet valve means and the supply valve means, switch means for arresting the operation of the milking plant, cam means for operating the control means and the switch means, and means for driving the cam means, wherein the driving means is operable by a pulsating vacuum and arranged to advance the cam means through a given distance at each pulsation, and the cam means is arranged so to operate the control means and the switch means as to cause the outlet valve means to close, thereafter to cause the supply valve means to open to supply rinsing liquid to the wash tank, and, after the elapse of a predetermined rinsing period, to operate the switch means to arrest the operation of the milking plant, and wherein the outlet valve means and the supply valve means each comprise a valve and a pressure-responsive flexible diaphragm for actuating the valve, and the control means comprises control valve means for controlling the application of a reduced pressure from the vacuum milking plant to the pressure responsive diaphragm of each of the supply and outlet valves.

6. Apparatus for cleaning a vacuum milking plant, which apparatus comprises a washtank, means for supplying a washing liquid to the washtank, means for supplying a rinsing liquid to the washtank, outlet means for emptying the washtank which includes a valve and pressure-responsive means for actuating the valve, means for controlling each supply means and the outlet means, switch means for arresting the operation of the milking plant, cam means for operating the control means and the switch means, and means for driving the cam means, the driving means being operable by a pulsating vacuum and arranged to advance the cam means through a given distance at each pulsation, wherein the cam means is arranged so to operate the control means as first to cause the outlet means to open to allow the washtank to empty after the elapse of a predetermined pre-rinsing period, then to cause the outlet means to close and the washing-liquid supply means to supply washing liquid to the washtank, thereafter to cause the outlet means to open to enable the washtank to empty after the elapse of a predetermined washing period, then to cause the outlet means to close, thereafter to cause the rinsing-liquid supply means to supply rinsing liquid to the washtank, and, after the elapse of a predetermined rinsing period, to switch off the milking plant, and wherein the means for supplying a washing liquid and the means for supplying a rinsing liquid each include a supply valve and pressure responsive means for actuating the valve, the cam means comprises two cams coupled together, and the control means includes two cam followers and two control valves for controlling the application of a reduced pressure from the vacuum milking plant to the pressure-responsive means for the outlet valve and each supply valve, and the arrangement is such that one of the cam followers engages one of the cams and actuates the control valve that controls the application of reduced pressure to the pressure-responsive means of two valves selected from the group consisting of the outlet valve and the two supply valves, and the other follower engages the other cam and actuates the other control valve which controls the application of reduced pressure to the pressure-responsive means of the third valve.

7. Apparatus for cleaning a vacuum milking plant which apparatus comprises a wash tank, means for supplying a rinsing liquid to the wash tank, outlet means for emptying the washtank, means for controlling the supply means and outlet means, switch means for arresting the operation of the milking plant, rotary cam means for operating the control means and the switch means, and driving means for the rotary cam means that includes a ratchet wheel, coupled to the rotary cam means by reduction gearing, and a pawl engaging the ratchet wheel, the arrangement being such that the pawl is caused to reciprocate in response to the pulsating vacuum thereby causing the ratchet wheel to rotate, and the rotary cam means performs substantially one revolution during a complete cleaning operation, and the rotary cam means is arranged so to operate the control means and the switch means as to cause the outlet means to open to empty the wash tank after the elapse of a predetermined washing period, then to cause the outlet means to close, thereafter to cause the supply means to supply rinsing liquid to the wash tank and, after the elapse of a predetermined rinsing period, to switch off the milking plant.

8. Apparatus as claimed in claim 7, wherein there is provided means for indicating visually the angular position of the rotary cam means, which indicating means includes a pointer coupled to the rotary cam means and arranged to move over a scale calibrated to show the stage reached in the sequence of operations.

9. Apparatus as claimed in claim 7, wherein the drive from the ratchet wheel to the rotary cam means includes a friction drive and there is provided means for rotating the rotary cam means manually to override the friction drive for adjusting the starting position of the rotary cam means.

10. Apparatus for cleaning a vacuum milking plant, which apparatus comprises a wash tank, means for supplying a rinsing liquid to the wash tank, outlet means for emptying the wash tank, means for controlling the supply means and outlet means, switch means for arresting the operation of the milking plant, cam means for operating the control means and the switch means, means for driving the cam means, the driving means being operable by a pulsating vacuum and arranged to advance the cam means through a given distance at each pulsation, and cut-off means for interrupting communication between the interior of the liners of the teat-cup clusters and the supply of reduced pressure of the vacuum milking plant, the cam means being arranged so to operate the control means and the switch means as to cause the outlet means to open to empty the wash tank after the elapse of a predetermined washing period, then to cause the outlet means to close, immediately thereafter to cause the supply means to supply rinsing liquid to the wash tank, and, after the elapse of a predetermined rinsing period, to switch off the milking plant, and the control means is arranged to operate the cut-off means to interrupt communication between the liners of the teat-cups and the supply of reduced pressure whenever, and only while, the outlet means is open.

11. Apparatus as claimed in claim 10, wherein the cut-off means comprises a cut-off valve and pressure-responsive means for actuating the cut-off valve, the pressure-responsive means being connected in parallel with the pressure-responsive means of the outlet means.

References Cited in the file of this patent

UNITED STATES PATENTS

| | | |
|---|---|---|
| 1,538,734 | Oden | May 19, 1925 |
| 2,680,445 | Hemminger | June 8, 1954 |
| 2,818,076 | Erling | Dec. 31, 1957 |
| 2,915,072 | Merritt | Dec. 1, 1959 |